United States Patent
Song et al.

(10) Patent No.: US 9,008,185 B2
(45) Date of Patent: Apr. 14, 2015

(54) APPARATUS AND METHOD OF LOSSLESS COMPRESSION/RESTORATION OF SELECTIVE IMAGE INFORMATION

(75) Inventors: Joon Ho Song, Hwaseong-si (KR); Shi Hwa Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 744 days.

(21) Appl. No.: 12/453,118

(22) Filed: Apr. 29, 2009

(65) Prior Publication Data

US 2010/0135415 A1   Jun. 3, 2010

(30) Foreign Application Priority Data

Dec. 2, 2008 (KR) .................. 10-2008-0120963

(51) Int. Cl.
| | |
|---|---|
| H04B 1/66 | (2006.01) |
| H04N 7/12 | (2006.01) |
| H04N 11/02 | (2006.01) |
| H04N 11/04 | (2006.01) |
| H04N 19/127 | (2014.01) |
| H04N 19/15 | (2014.01) |
| H04N 19/176 | (2014.01) |
| H04N 19/423 | (2014.01) |

(52) U.S. Cl.
CPC ... *H04N 19/00187* (2013.01); *H04N 19/00103* (2013.01); *H04N 19/00278* (2013.01); *H04N 19/00484* (2013.01)

(58) Field of Classification Search
None
See application file for complete search history.

(56) References Cited

U.S. PATENT DOCUMENTS

| | | | |
|---|---|---|---|
| 6,885,319 B2 | 4/2005 | Geiger et al. | |
| 2008/0069464 A1* | 3/2008 | Nakayama | 382/244 |
| 2011/0044385 A1* | 2/2011 | Bock | 375/240.01 |

FOREIGN PATENT DOCUMENTS

| | | |
|---|---|---|
| JP | 2007-266970 | 10/2007 |
| JP | 2007-306152 | 11/2007 |
| KR | 10-2006-0083610 | 7/2006 |
| KR | 10-2006-0109836 | 10/2006 |
| KR | 10-2007-0090165 | 9/2007 |
| KR | 10-2008-0049535 | 6/2008 |

OTHER PUBLICATIONS

Korean Office Action issued Sep. 28, 2014 in corresponding Korean Patent Application No. 10-2008-0120963.

* cited by examiner

*Primary Examiner* — Mehrdad Dastouri
*Assistant Examiner* — Kristin Dobbs
(74) *Attorney, Agent, or Firm* — Staas & Halsey LLP

(57) ABSTRACT

Disclosed are an apparatus and method of lossless compression and restoration of selective image information. The apparatus of lossless compression of selective image information may compress an uncompressed block image of image information without loss to convert the uncompressed block image into a compressed block image, and store the converted compressed block image.

9 Claims, 8 Drawing Sheets

APPARATUS AND METHOD OF LOSSLESS COMPRESSION/RESTORATION OF SELECTIVE IMAGE INFORMATION

CROSS-REFERENCE TO RELATED APPLICATION

This application claims the benefit of Korean Patent Application No. 10-2008-120963, filed on Dec. 2, 2008, in the Korean Intellectual Property Office, the disclosure of which is incorporated herein by reference.

BACKGROUND

1. Field

Example embodiments relate to an apparatus and method of lossless compression and restoration.

2. Description of the Related Art

A process of converting image signals into a digital bit stream is generally referred to as coding, and a process of converting the digital bit stream into the image signals is generally referred to as decoding. The decoding may correspond to an inverse process of the coding.

A moving picture coding/decoding device may perform the decoding on the image signals utilizing a prediction coding algorithm using reference images. The prediction coding algorithm may use a large amount of memory bandwidth, and a larger amount of the memory bandwidth may be used as a size of a decoded moving picture increases.

In addition, when the size of the encoded/decoded moving picture is relatively large, a large amount of memory space for storing the reference images may be used. To overcome this problem, an image compression and restoration apparatus may be used. This apparatus may compress and store the reference images in an input/output of the moving picture coding/decoding device. In this instance, an image compression method may include a lossy coding method and a lossless coding method. The lossy coding method may not satisfy a conformance condition due to information about the reference images becoming lost during compression. Also, in the lossless coding method, a size of a compressed image may not be evenly obtained, and thus addressing may become complicated when considering a partial block within the reference image.

SUMMARY

According to example embodiments, there may be provided an apparatus for lossless compression, the apparatus including: a conversion unit to compress an uncompressed block image of image information without loss to convert the uncompressed block image into a compressed block image, the image information being received from a moving picture coding/decoding device, the moving picture coding/decoding device being in communication with the apparatus; a determination unit to determine whether the compressed block image satisfies a compression objective; and a processing unit to process the compressed block image when the compressed block image satisfies the compression objective according to a determined result.

Additional aspects will be set forth in part in the description which follows and, in part, will be apparent from the description, or may be learned by practice of the invention.

In this instance, the processing unit may store the uncompressed block image when the compressed block image does not satisfy the compression objective according to the determined result.

Also, when the compressed block image satisfies the compression objective according to the determined result, the processing unit may store the compressed block image in a compressed image region within a memory, the memory being in communication with the apparatus, and when the compressed block image does not satisfy the compression objective according to the determined result, the processing unit may store a first part of the uncompressed block image in the compressed image region and a second part of the uncompressed block image in a supplementary region within the memory.

Also, the processing unit may store the first part of the uncompressed block image and address information in the compressed image region and the second part of the uncompressed block image in a location, corresponding to the address information, of the supplementary region when the compressed block image does not satisfy the compression objective according to the determined result.

Also, the compression objective may be determined to be satisfied when a size of the compressed block image is smaller than or equal to a predetermined size determined by the compression objective.

Also, when the compressed block image satisfies the compression objective according to the determined result, the processing unit may store the compressed block image in a compressed image region within a memory, the memory being in communication with the apparatus, and when the compressed block image does not satisfy the compression objective according to the determined result, the processing unit may store a first part of the compressed block image in the compressed image region and a second part of the compressed block image in a supplementary region within the memory.

According to example embodiments, there may be also provided an apparatus of lossless restoration of selective image information, the apparatus including: a processing unit to extract data from a memory, the memory being in communication with the apparatus; a determination unit to determine whether the extracted data is a compressed block image; and a conversion unit to restore an uncompressed block image without loss from the compressed block image when the data is the compressed block image according to a determined result, and to output the restored uncompressed block image to a moving picture coding/decoding device, the moving picture coding/decoding device being in communication with the apparatus.

In this instance, the conversion unit may output the uncompressed block image to the moving picture coding/decoding device when the data is the uncompressed block image.

Also, the processing unit may extract a first part of the data from a compressed image region within the memory and a second part of the data from a supplementary region within the memory, and when the data is the uncompressed block image, the conversion unit may output the uncompressed block image including of the first part and the second part to the moving picture coding/decoding device.

According to example embodiments, there may be also provided a method for lossless compression, the method including: receiving an uncompressed block image of image information from a moving picture coding/decoding device; converting the uncompressed block image into a compressed block image, including; compressing the uncompressed block image of image information without loss; determining whether the compressed block image satisfies a compression objective; and storing the compressed block image when the compressed block image satisfies the compression objective according to a determined result.

Example embodiments may provide an apparatus and method of lossless compression and restoration of selective image information, which may store a compressed block image when a result of the lossless compression satisfies a compression objective. The method and apparatus may also divide an uncompressed block image into a compressed image region and a supplementary region to store the divided images when the result of the lossless compression does not satisfy the compression objective, thereby reducing memory bandwidth used for storing.

Example embodiments may provide an apparatus and method of lossless compression and restoration of selective image information, which may compress and restore image information without loss, thereby increasing a processing speed.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
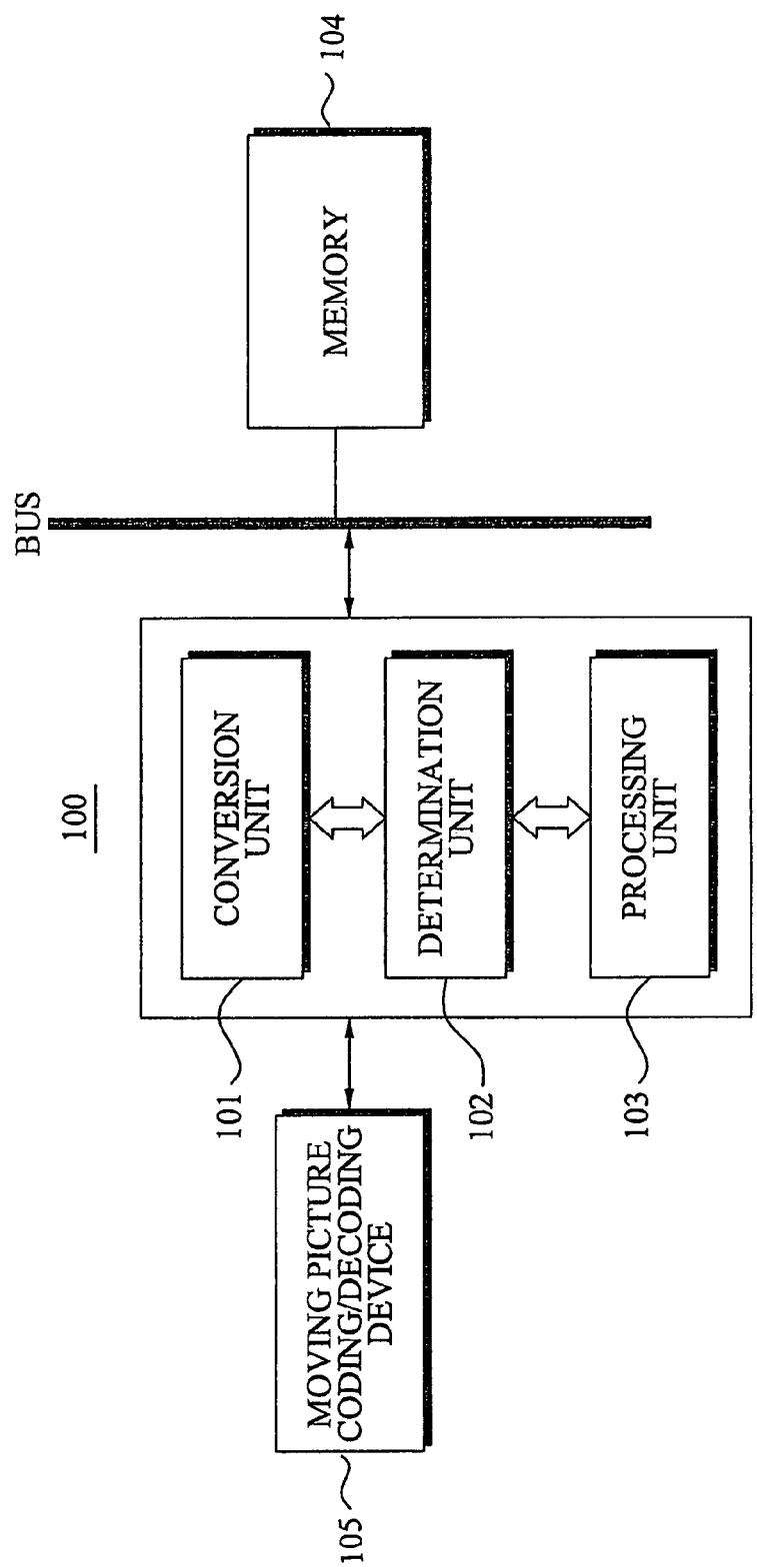
FIG. 1 illustrates a block diagram of an apparatus of lossless compression and restoration of selective image information according to example embodiments.

Reference will now be made in detail to example embodiments, examples of which are illustrated in the accompanying drawings, wherein like reference numerals refer to like elements throughout. Example embodiments are described below to explain the present disclosure by referring to the figures.

FIG. 1 illustrates a block diagram of an apparatus 100 of lossless compression and restoration of selective image information according to example embodiments. In this instance, the apparatus 100 may be operated by an apparatus of lossless compression of selective image information or an apparatus of lossless restoration of selective image information.

As illustrated in FIG. 1, the apparatus 100 may compress image information, corresponding to an output of a moving picture coding/decoding device 105, without loss to transmit the compressed image information to a memory 104, or restore, as the image information, block images transmitted from the memory 104 according to a request of the moving picture coding/decoding device 105 to transmit the restored block images to the moving picture coding/decoding device 105.

Also, the moving picture coding/decoding device 105 may perform coding/decoding on a moving picture according to a moving picture coding/decoding algorithm, and transmission of data between system blocks may be performed using a burst signal (BUS). Also, data may be stored in the memory. In this instance, as an example of the memory, a synchronous dynamic RAM (SDRAM) may be given.

Also, according to an example embodiment, a memory controller may be configured between the BUS and the memory 104. In this instance, the memory controller may store, in the memory, data being accessed in the memory via the BUS, or data read from the memory 104.

Also, as illustrated in FIG. 1, the apparatus 100 includes a conversion unit 101, a determination unit 102, and a processing unit 103. An operation method of the apparatus 100 will be described in detail with reference to FIGS. 2 to 8.

Figure 2:
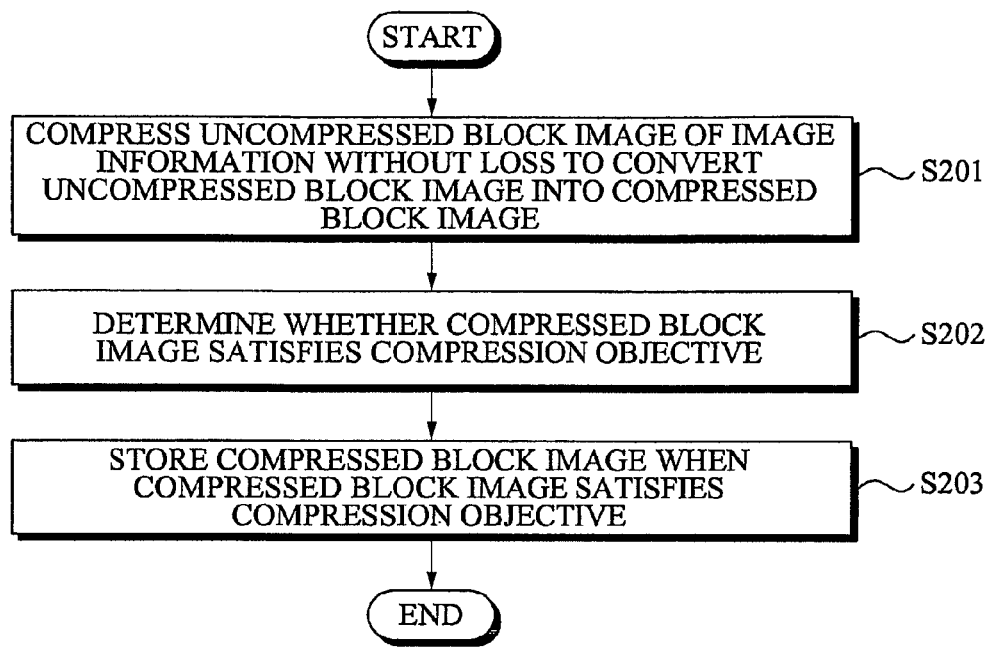
FIG. 2 illustrates a method of lossless compression of selective image information according to example embodiments.

FIG. 2 illustrates a method of lossless compression of selective image information according to example embodiments.

As illustrated in FIG. 2, the method according to the present example embodiment includes operations S201 to S203. In this instance, operations S201, S202, and S203 may be respectively performed by the conversion unit 101, the determination unit 102, and the processing unit 103.

In operation S201, the conversion unit 101 may compress an uncompressed block image of image information, received from the moving picture coding/decoding device, without loss to convert the uncompressed block image into a compressed block image. In this instance, the uncompressed block image may be any one of macro blocks of the image information. For example, the image information may be divided into a plurality of uncompressed block images, and the conversion unit 101 may receive a first uncompressed block image from among the uncompressed block images. Also, the conversion unit 101 may compress the uncompressed block image without loss through a lossless compression process, thereby generating the compressed block image.

In operation S202, the determination unit 102 may determine whether the compressed block image satisfies a compression objective. For an example, the compression objective of the compressed block image is determined to be satisfied when a size of the compressed block image is less than or equal to a predetermined size determined by the compression objective. Also, according to an example embodiment, the determination unit 102 may determine the compression objective to be satisfied when the compressed block image satisfies a predetermined compression rate.

In operation S203, the processing unit 103 may store the compression block image when the compression objective is determined to be satisfied. In this instance, the processing unit 103 may store the compressed block image and flag information. Also, according to an example embodiment, the processing unit 103 may store the uncompressed block image when the compression objective is determined to be not satisfied.

For example, when the compression objective is determined to be satisfied, the processing unit 103 may store the compressed block image and the flag information in a compressed image region within the memory 104. Also, when the compression objective is determined to be not satisfied, the processing unit 103 may store, in the compressed image region, address information of a supplementary region within the memory, where a first part of the uncompressed block image and a second part of remaining parts of the uncompressed block image are stored, and also store the second part of the uncompressed block image in a location within the supplementary region corresponding to the address information. In this instance, the flag information may designate whether the compression objective is satisfied. For example, the processing unit 103 may set the flag information as '1' when the compression objective is satisfied, and may set the flag information as '0' when the compression objective is not satisfied.

Figure 3:
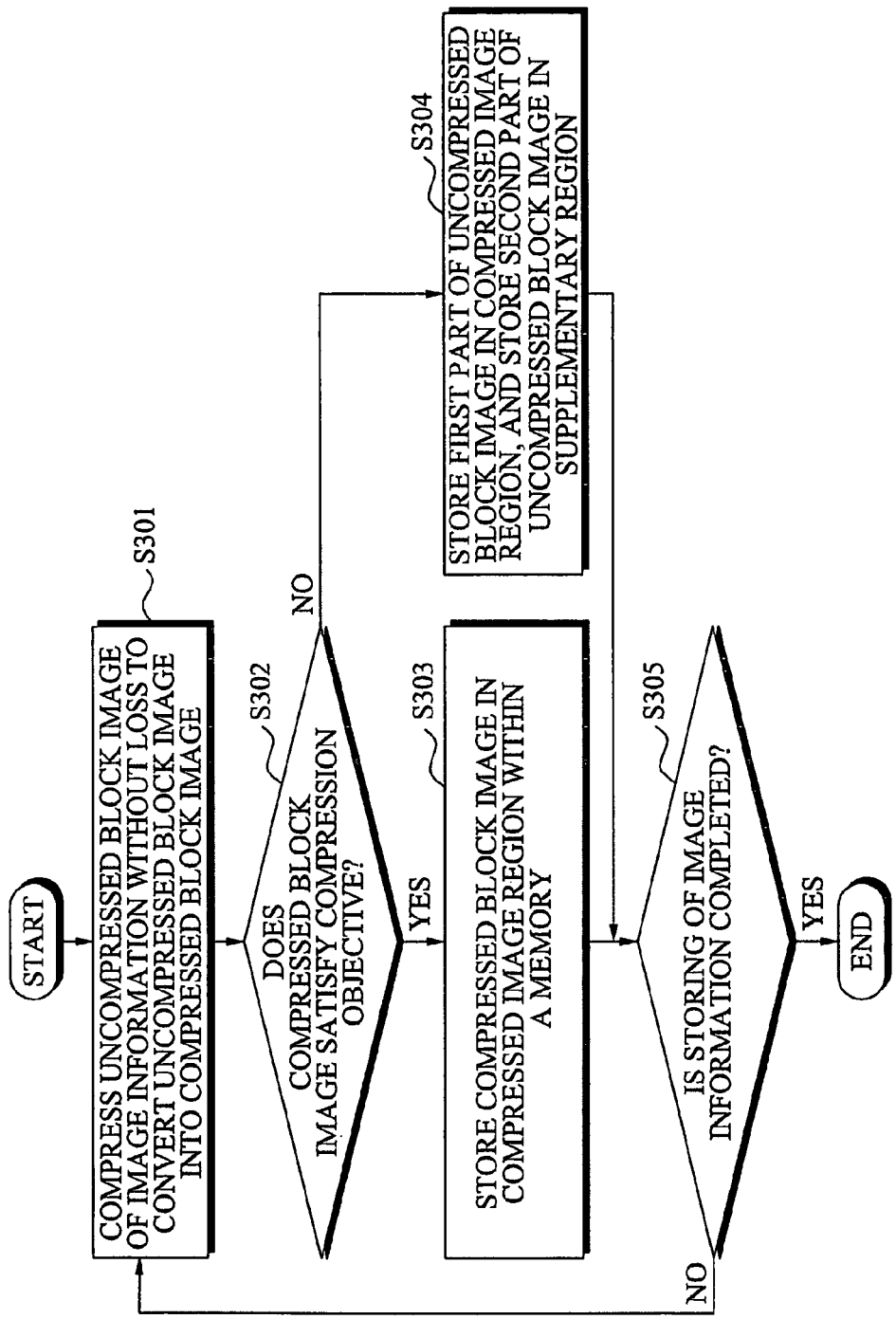
FIG. 3 illustrates another method of lossless compression of selective image information according to example embodiments.

FIG. 3 illustrates another method of lossless compression of selective image information according to example embodiments.

As illustrated in FIG. 3, the method according to the present example embodiment includes operations S301 to S305. In this instance, operations S301, S302, and S303 to S305 may be respectively performed by the conversion unit 101, the determination unit 102, and the processing unit 103.

In operation S301, the conversion unit 101 may compress an uncompressed block image of image information, received from the moving picture coding/decoding device, without loss to convert the uncompressed block image into a lossless-compressed block image. Also, the conversion unit 101 may set size information of the uncompressed block image, compression objective, and address information associated with storing in the memory 104. In this instance, the size information, the compression objective, and the address information may be received from the moving picture coding/decoding device, or may be inputted from another external device. Also, as examples of the address information, address information of a compressed image region within the memory where a first part of the uncompressed block image is stored, and address information of a supplementary region within the memory where a second part of remaining parts of the uncompressed block image is stored may be given.

In operation S302, the determination unit 102 may determine whether the compressed block image satisfies the compression objective. Next, operation S303 may be performed when the compression objective is determined to be satisfied, and operation S304 may be performed when the compression objective is determined to be not satisfied. For an example, the compression objective of the compressed block image is determined to be satisfied when a size of the compressed block image is less than or equal to a predetermined size determined by the compression objective. Also, the compression objective may designate a size in which a single block image is stored in the compressed image region within the memory.

In operation S303, the processing unit 103 may store the compressed block image in the compressed image region within the memory when the compression objective is determined to be satisfied. Also, in operation S304, when the compression objective is determined to be not satisfied, the processing unit 103 may store the first part of the uncompressed block image in the compressed image region, and store the second part of remaining parts of the uncompressed block image in the supplementary region within the memory. In this instance, the processing unit 103 may store the first part of the uncompressed block image and the address information in the compressed image region, and store the second part of the uncompressed block image in a location of the supplementary region corresponding to the address information.

In operation S305, the processing unit 103 may determine whether storing of the image information is completed. The processing unit 103 may terminate operations of the method of lossless compression of selective image information when the storing of the image information is completed, and operation S301 may be performed for a following process of the uncompressed block image when the storing of the image information is not completed. For example, the image information may include a first uncompressed block image to a tenth uncompressed block image, and the processing unit 103 may terminate the operations of the method of lossless compression of selective image information when storing for the first uncompressed block image to the tenth uncompressed block image are completed.

Also, non-described functions in operations S301 to S305 may be identical to, or easily understood from those in FIGS. 1 and 2, and thus descriptions thereof will be herein omitted.

Figure 4:
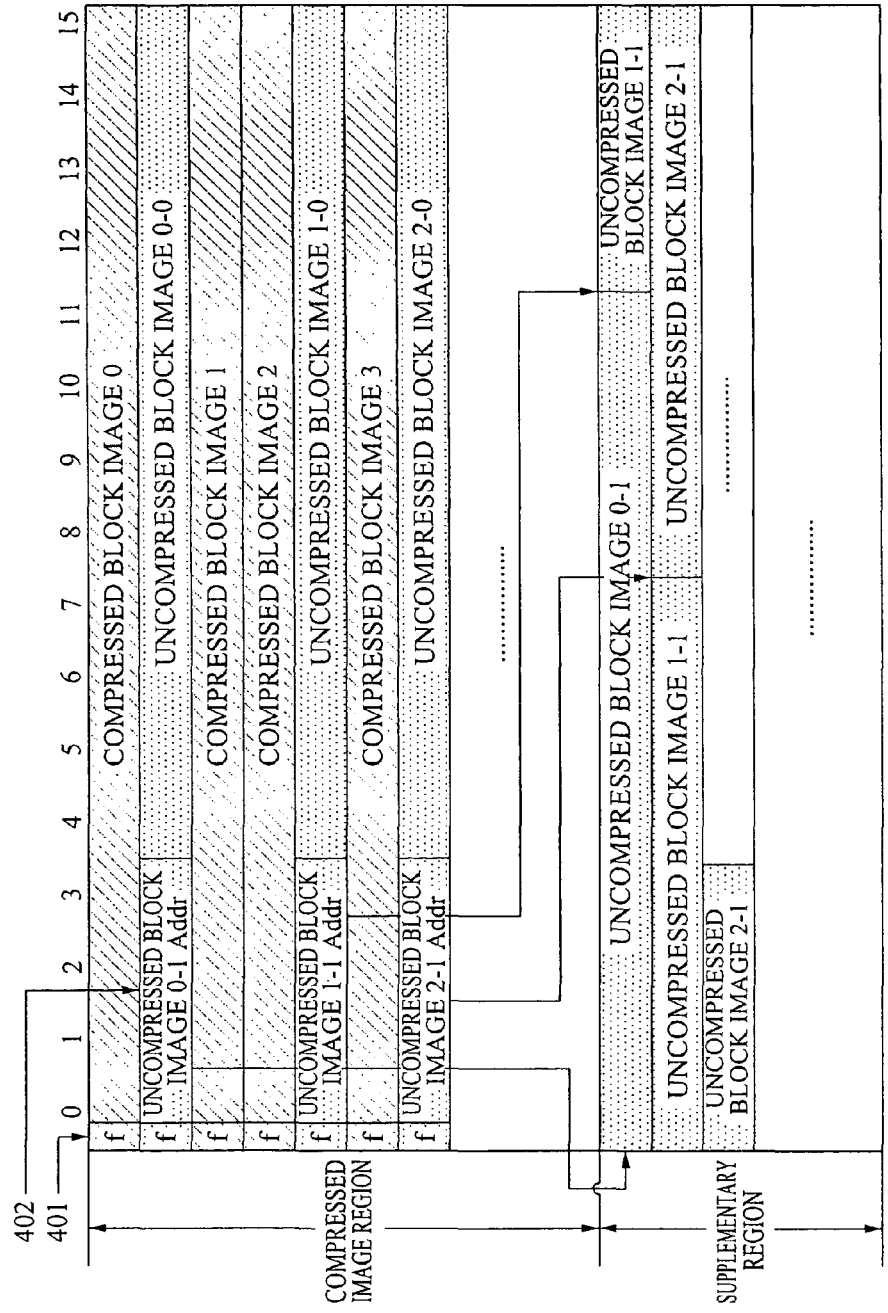
FIG. 4 illustrates block images stored in a memory according to example embodiments.

FIG. 4 illustrates block images stored in a memory according to example embodiments.

As illustrated in FIG. 4, the apparatus of lossless compression of selective image information may compress an uncompressed block image, received from the moving picture coding/decoding device, without loss to generate a compressed block image, set flag information 401 as '1' when the generated compressed block image satisfies the compression objective, and store the set flag information together with the compressed block image.

Conversely, when the generated compressed block image does not satisfy the compression objective, the apparatus of lossless compression of selective image information may set the flag information 401 as '0', and store, in the compressed image region within the memory, the flag information 401, address information 402 of a supplementary region within the memory where the second part of the uncompressed block image is stored, and the first part of the uncompressed block image, and also store the second part of the uncompressed block image in the supplementary region of the memory.

Also, the apparatus of lossless compression of selective image information may sequentially process a plurality of uncompressed block images constituting the image information to store the processed uncompressed block images in the memory. For example, as illustrated in FIG. 4, the apparatus of lossless compression of selective image information may sequentially store a compressed block image 0, an uncompressed block image 0, a compressed block image 1, a compressed block image 2, and an uncompressed block image 1. In this instance, the uncompressed block image 0 may be divided into an uncompressed block image 0-0 of a first part, and an uncompressed block image 0-1 of a second part to thereby be stored in the compressed image region and the supplementary region, respectively.

Figure 5:
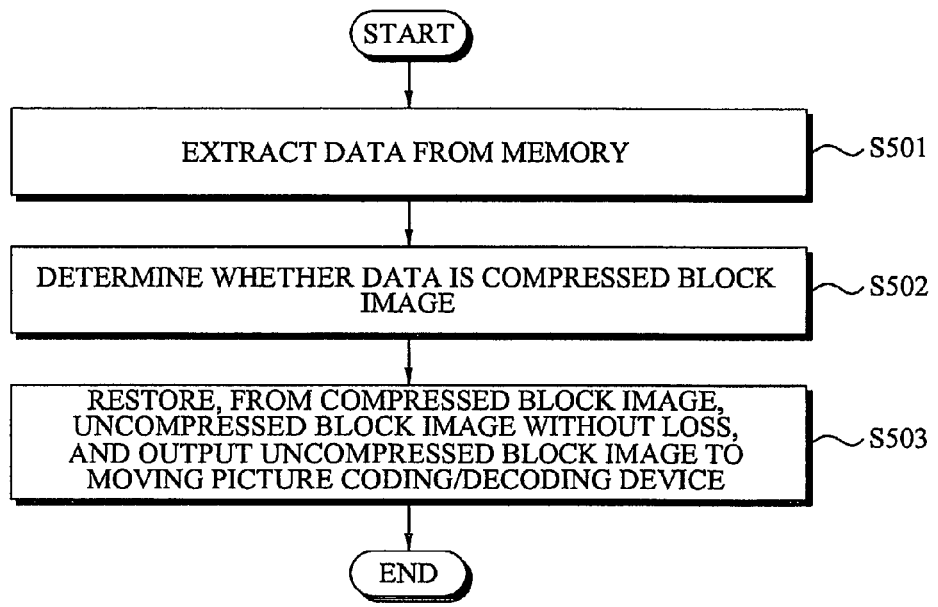
FIG. 5 illustrates a method of lossless restoration of selective image information according to example embodiments.

FIG. 5 illustrates a method of lossless restoration of selective image information according to example embodiments.

As illustrated in FIG. 5, the method according to the present example embodiment includes operation S501 to operation S503. In this instance, operations S501, S502, and S503 may be respectively performed by the processing unit 103, the determination unit 102, and the conversion unit 101.

In operation S501, the processing unit 103 may extract data from the memory 104. In this instance, the data may be any one of an uncompressed block image and a compressed block image. Also, the processing unit 103 may further extract flag information together with the data.

In operation S502, the determination unit 102 may determine whether the data is the compressed block image. In this instance, according to an example embodiment, the determination unit 102 may determine whether the data is the compressed block image, using the flag information. For example, the determination unit 102 may determine the data as the compressed block image when the flag information is '1', and determine the data as the uncompressed block image when the flag information is '0'.

In operation S503, when the data is determined as the compressed block image, the conversion unit 101 may restore, from the compressed block image, the uncompressed block image without loss, and output the restored uncompressed block image to the moving picture coding/decoding device.

Also, according to an example embodiment, the conversion unit 101 may output the uncompressed block image to the moving picture coding/decoding device, when the data is determined as the uncompressed block image. In this instance, the uncompressed block image may include a first part extracted from the compressed image region within the memory 104 and a second part extracted from the supplementary region within the memory 104.

Also, non-described functions in the method of lossless compression of selective image information according to the present example embodiment may be readily understood from those in the method of lossless compression of selective image information of FIGS. 1 to 5, and thus descriptions thereof will be herein omitted.

Figure 6:
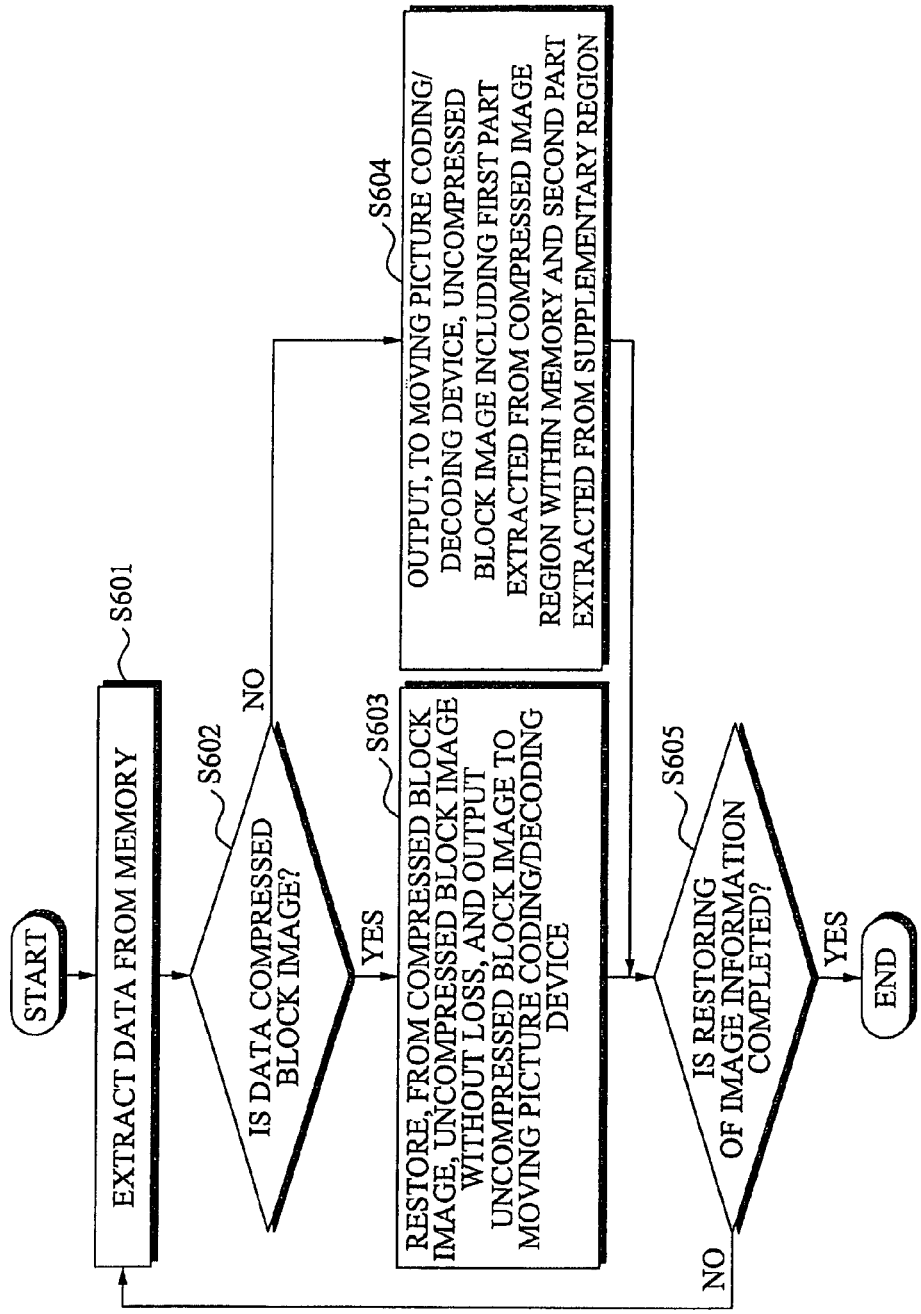
FIG. 6 illustrates another method of lossless restoration of selective image information according to example embodiments.

FIG. 6 illustrates another method of lossless restoration of selective image information according to example embodiments.

As illustrated in FIG. 6, the method according to the present example embodiment includes operations S601 to S605. In this instance, operations S601, S602, and S603 to S605 may be respectively performed by the processing unit 103, the determination unit 102, and the conversion unit 101.

In operation S601, the processing unit 103 may extract data from the memory 104. In this instance, the data may be any one of an uncompressed block image and a compressed block image. Also, the processing unit 103 may further extract flag information together with the data. Also, when the data is determined as the uncompressed block image, the processing unit 103 may extract a first part of the data from a compressed image region within the memory 104, and also extract a second part of the data from a supplementary region within the memory 104. In this instance, the processing unit 103 may extract the first part of the data and address information from the compressed image region within the memory 104, and extract the second part of the data from the supplementary region using the address information.

In operation S602, the determination unit 102 may determine whether the data is the compressed block image. When the data is determined as the compressed block image, operation S603 may be performed, and when the data is determined as the uncompressed block image, operation S604 may be performed. In this instance, according to an example embodiment, the determination unit 102 may determine whether the data is the compressed block image, using the flag information.

In operation S603, the conversion unit 101 may restore, from the compressed block image, the uncompressed block image without loss, and output the restored uncompressed block image to the moving picture coding/decoding device. In this instance, the uncompressed block image may be restored through a lossless restoration process.

In operation S604, the conversion unit 101 may output, to the moving picture coding/decoding device, the uncompressed block image being including the first part and the second part.

In operation S605, the conversion unit 101 may determine whether restoration of the image information is completed, and terminate operations of the method of lossless compression of selective image information when the restoration of the image information is completed, and operation S601 may be performed for a following process of the data when the restoration of the image information is not completed. For example, the data may include first data to tenth data corresponding to a first uncompressed block image to a tenth uncompressed block image including the image information. The conversion unit 101 may terminate operations of the method of lossless restoration of selective image information after completing all restoration with respect to the first data to the tenth data.

Also, non-described functions in operations S601 to S605 may be identical to, or easily understood from those in FIGS. 1 to 5, and thus descriptions thereof will be herein omitted.

According to an example embodiment, in operation S203 of FIG. 2, when the compression objective is determined to be satisfied, the processing unit 103 may store the compressed block image in the compressed image region within the memory 104. When the compression objective is determined to be not satisfied, the processing unit 103 may store the first part of the compressed block image in the compressed image region within the memory 104 and the second part of the compressed block image in the supplementary region within the memory. In this manner, in operation S503 of FIG. 5, the conversion unit 101 may restore, from the compressed block image including the first part and the second part, the uncompressed block image without loss, and output the restored uncompressed block image to the moving picture coding/decoding device. In this instance, the processing unit 103 may extract the first part of the data from the compressed image region within the memory 104, and also extract the second part of the data from the supplementary region within the memory 104.

Figure 7:
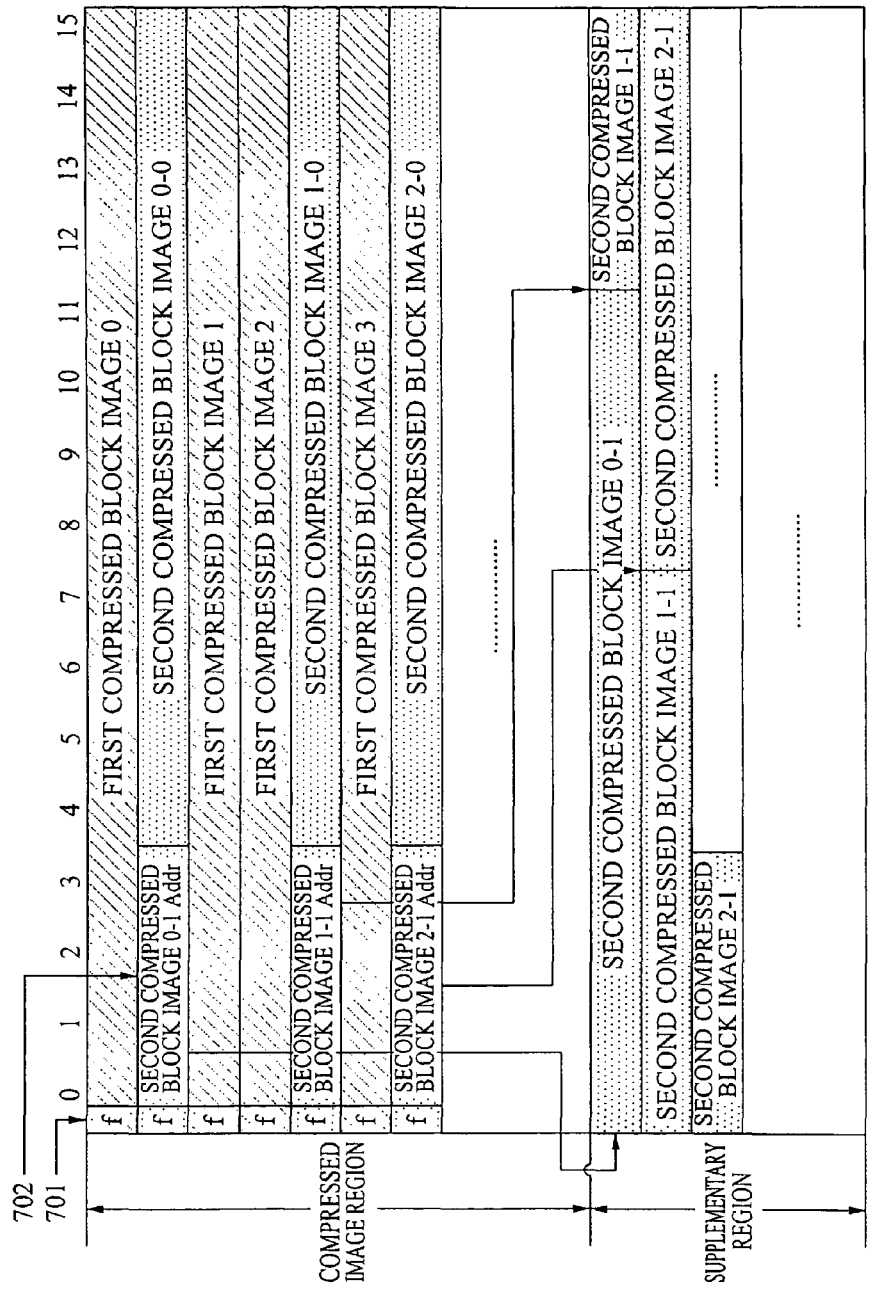
FIG. 7 illustrates block images stored in a memory according to example embodiments.

FIG. 7 illustrates block images stored in the memory 104 according to example embodiments.

As illustrated in FIG. 7, the apparatus of lossless compression of selective image information may compress an uncompressed block image, received from the moving picture coding/decoding device, without loss to generate a compressed block image. The apparatus of lossless compression of selective image information may set flag information 701 as '1' when the generated compressed block image satisfies the compression objective, and store the flag information 701 and the compressed block image.

Conversely, when the compressed block image does not satisfy the compression objective, the apparatus of lossless compression of selective image information may set the flag information 701 as '0', and store, in the compressed image region of the memory, the flag information 701. The apparatus also stores address information 702 of the supplementary region within the memory where the second part of the compressed block image is stored, and the first part of the compressed block image, and also store the second part of the compressed block image in the supplementary region of the memory 104.

Also, the apparatus of lossless compression of selective image information may sequentially process a plurality of uncompressed block images including the image information to store the processed uncompressed block images in the memory 104. For example, as illustrated in FIG. 7, the apparatus of lossless compression of selective image information may store a first compressed block image 0, a second compressed block image 0, a first compressed block image 1, a second compressed block image 2, a second compressed block image 1 in the stated order. In this instance, the second compressed block image 0 may be divided into a second compressed block image 0-0 of a first part and a second compressed block image 0-1 of a second part to thereby be stored in the compressed image region and the supplementary region, respectively. In this manner, the apparatus of lossless compression of selective image information may extract, from the memory, the first compressed block image 0, the second compressed block image 0, the first compressed block image 1, and the first compressed block image 2, and the second compressed block image 1 to restore the image information.

Figure 8:
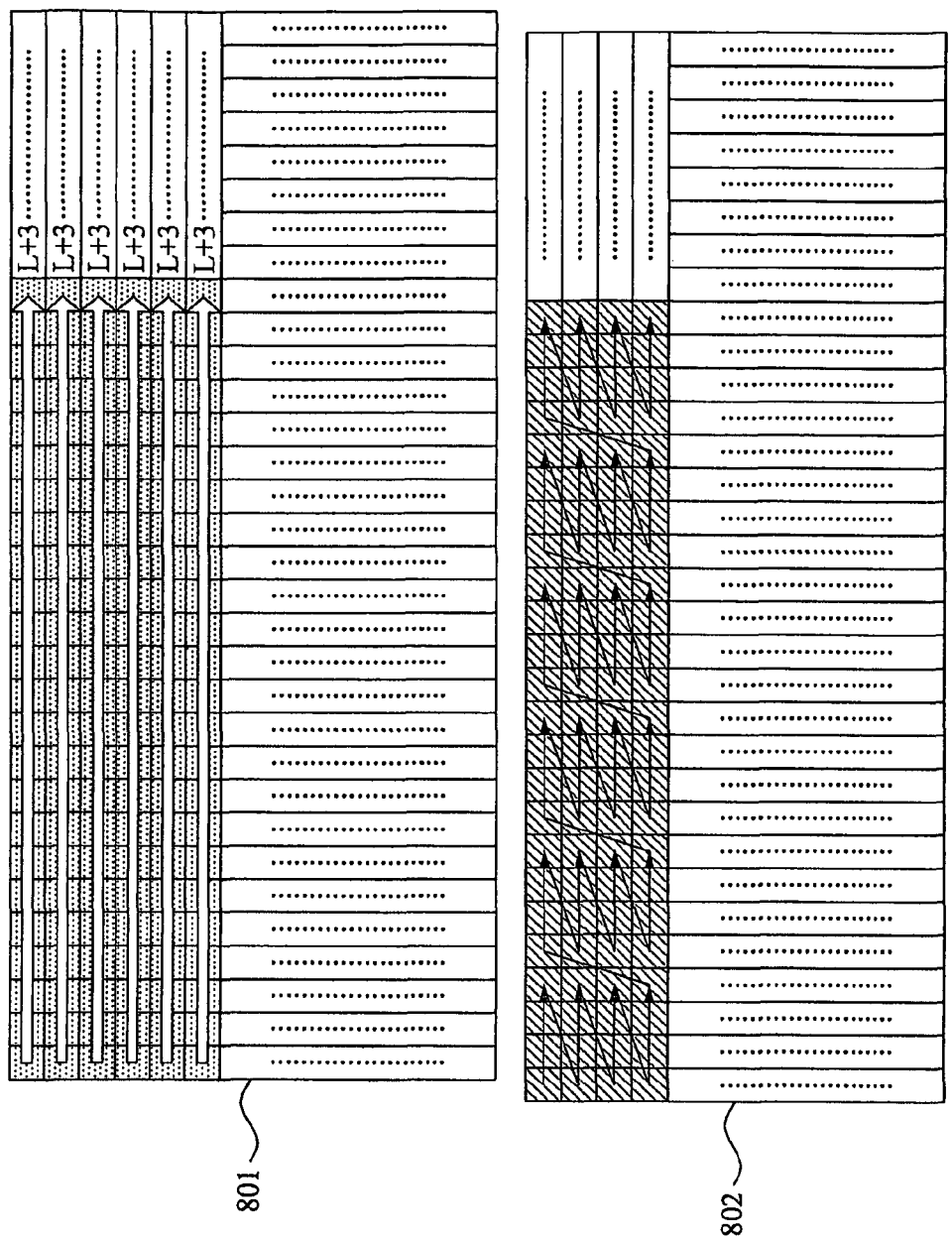
FIG. 8 illustrates a result of a reduction in a memory bandwidth according to example embodiments.

FIG. 8 illustrates a result of a reduction in a memory bandwidth according to example embodiments.

As illustrated in a section 801, when the moving picture coding/decoding device reads, from a 64-bit memory, data of 24*4 YUV 4:2:0 of the image information, 6*(L+3) cycles may be needed. However, as illustrated in a section 802, when the image information is compressed by a factor of 1:5 in a 4*4 YUV-interleaved 4*6 block unit using the apparatus of lossless compression/restoration of selective image information, the image information may not be read using only (L+12) cycles. In this instance, L may be latency, and may necessitate 12 cycles.

The method of lossless compression/restoration of selective image information according to the above-described example embodiments may be recorded as computer-readable code/instructions in/on computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus of lossless compression, the apparatus comprising:
a processor to control each of the following units;
a conversion unit to compress an uncompressed block image of image information without loss to convert the uncompressed block image into a compressed block image;
a determination unit to determine, by a processor, whether the compressed block image satisfies a compression objective based on a size of the compressed block image; and
a processing unit to store, in a first region within a memory, the compressed block image, when the compressed block image satisfies the compression objective,
wherein the processing unit stores, in the first region within the memory, address information of a second region within the memory where a second part of the uncompressed block image or a second part of the compressed block image is stored, when the compressed block image does not satisfy the compression objective,
wherein the first region within the memory is a compressed image region and the second region within the memory is a supplementary region,
wherein, when the compressed block image does not satisfy the compression objective, the processing unit stores a first part of the uncompressed block image or a first part of the compressed block image in the compressed image region and a second part of the uncompressed block image or a second part of the compressed block image in the supplementary region, and
wherein the processing unit stores the second part of the uncompressed block image or the second part of the compressed block image in a location, corresponding to the address information, of the supplementary region when the compressed block image does not satisfy the compression objective.

2. The apparatus of claim 1, wherein, the compression objective is determined to be satisfied when the size of the compressed block image is smaller than or equal to a predetermined size determined by the compression objective.

3. The apparatus of claim 1, wherein, when the compressed block image satisfies the compression objective, the processing unit stores the compressed block image in a compressed image region within the memory, the memory being in communication with the apparatus, and when the compressed block image does not satisfy the compression objective, the processing unit stores the first part of the compressed block image in the compressed image region and the second part of the compressed block image in a supplementary region within the memory.

4. An apparatus of lossless restoration of selective image information, the apparatus comprising:
a processor to control each of the following units;
a processing unit to extract data from a memory;
a determination unit to determine, by a processor, whether the extracted data is a compressed block image; and
a conversion unit to restore an uncompressed block image without loss from the compressed block image when the data is the compressed block image,
wherein when the data is an uncompressed block image the processing unit extracts a first part of the data and address information from a first region within the memory, and a second part of the data, based on the address information, from a second region within the memory, wherein the conversion unit outputs the uncompressed block image comprising the first part and the second part,
wherein the first region within the memory is a compressed image region and the second region within the memory is a supplementary region,
wherein the processing unit extracts the second part of the data from the supplementary region using the address information, and
wherein the processing unit extracts a first part of the data from a compressed image region within the memory and a second part of the data from a supplementary region within the memory corresponding to the address information, and the conversion unit restores the uncompressed block image without loss from the compressed block image comprising the first part and the second part, and the conversion unit also outputs the restored uncompressed block image to a moving picture coding/decoding device.

5. The apparatus of claim 4, wherein the conversion unit outputs the uncompressed block image to a moving picture coding/decoding device when the data is the uncompressed block image.

6. A method of lossless compression, the method comprising:
receiving an uncompressed block image;
compressing the uncompressed block image of image information without loss to convert the uncompressed block image into a compressed block image;
determining whether the compressed block image satisfies a compression objective based on a size of the compressed block image;

storing, in a first region within a memory, the compressed block image when the compressed block image satisfies the compression objective;

storing, in the first region within the memory, address information of a second region within the memory where a first part of the uncompressed block image or a first part of the compressed block image is stored, when the compressed block image does not satisfy the compression objective; and storing the first part of the uncompressed block image or the first part of the compressed block in a compressed image region within the memory and a second part of the uncompressed block image or a second part of the compressed block image in a supplementary region within the memory when the compressed block image does not satisfy the compression objective, wherein the first region within the memory is a compressed image region and the second region within the memory is a supplementary region, wherein, when the compressed block image does not satisfy the compression objective, the storing of the address information comprises storing a first part of the uncompressed block image or a first part of the compressed block image in the compressed image region and a second part of the uncompressed block image or a second part of the compressed block image in the supplementary region within the memory, and wherein the storing of the compressed block image comprises storing the compressed block image in a compressed image region within a memory when the compressed block image satisfies the compression objective.

7. The method of claim 6, further comprising determining the compression objective of the compressed block image to be satisfied when the size of the compressed block image is smaller than or equal to a predetermined size determined by the compression objective.

8. At least one non-transitory medium comprising computer readable instructions implementing the method of claim 6.

9. The apparatus of claim 1, wherein the processing unit stores, in a second region within the memory, a second part of the compressed block image or a second part of the uncompressed block image, when the compressed block image does not satisfy the compression objective.

* * * * *